United States Patent [19]

Allen

[11] Patent Number: 5,790,344

[45] Date of Patent: Aug. 4, 1998

[54] BASE CASTING/COVER FOR SEPARATING PACK BOUNCE AND SPINDLE TILT MODES IN A MAGNETIC STORAGE SYSTEM

[75] Inventor: Donald Giles Allen, Morgan Hill, Calif.

[73] Assignee: International Business Machines Corporation, Armonk, N.Y.

[21] Appl. No.: 862,142

[22] Filed: May 22, 1997

[51] Int. Cl.[6] .................................................. B11B 33/14
[52] U.S. Cl. ............................................................ 360/97.02
[58] Field of Search ........................... 360/97.01, 97.02, 360/98.08, 99.12

[56] References Cited

U.S. PATENT DOCUMENTS

| | | | |
|---|---|---|---|
| 4,764,829 | 8/1988 | Makino | 360/106 |
| 5,235,482 | 8/1993 | Schmitz | 360/97.02 |
| 5,483,398 | 1/1996 | Boutaghou | 360/97.02 |
| 5,587,855 | 12/1996 | Kim | 360/97.02 |

*Primary Examiner*—A. J. Heinz
*Attorney, Agent, or Firm*—Noreen A. Krall

[57] ABSTRACT

A base casting/cover for a magnetic storage system to minimize the impact of shocks and vibrations to the magnetic storage system. The base casting/cover of the present invention is weakened in the area to which the disk pack spindle shaft is attached, such that the pack bounce frequency and the spindle tilt frequency are separated by 20 Hz or more. The base casting/cover of the present invention is weakened by slits thereon in various configurations about the spindle shaft attachment area. The base casting/cover of the present invention further provides damping of the pack bounce frequency by covering the slits with an adhesive material.

18 Claims, 5 Drawing Sheets

BASE CASTING/COVER FOR SEPARATING PACK BOUNCE AND SPINDLE TILT MODES IN A MAGNETIC STORAGE SYSTEM

BACKGROUND OF THE INVENTION

1. Field of the Invention

The present invention relates generally to magnetic storage systems, and in particular to an improved base casting and/or cover apparatus that minimizes the effects of shock or vibrations on the operation of the magnetic storage system.

2. Description of the Related Art

Magnetic storage systems are information storage devices which utilize at least one rotatable magnetic disk having concentric data tracks defined for storing data, a magnetic recording head or transducer for reading data from and writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired track and maintaining the transducer over the data track centerline during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus, the suspension provides the desired slider loading and dimensional stability between the slider and an actuator arm which couples the transducer/slider/suspension assembly to the actuator. The actuator positions the transducer over the correct track according to the data desired on a read operation or the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot point and thus positioning the transducer as desired.

The magnetic media disk or disks in the magnetic storage system are mounted on a spindle and this entire assembly is collectively referred to as a disk pack. The spindle is attached to a spindle motor which rotates the spindle and the disks to provide read/write access to the various portions on the concentric tracks on the disks. The shaft of the spindle is anchored to either the base casting of the magnetic storage system and/or the cover, depending on the individual design of the system.

A prevailing problem encountered in the magnetic storage system industry is that when vibration or shock is applied to the disk drive in the Z axis, which is defined as the direction parallel to the spindle shaft, several different modes can be excited which would cause the heads to move offtrack over the disk and thus cause read or write errors. The two primary low frequency modes in the Z axis direction are described as follows. The first of these modes is the pack bounce mode. This is the first mode at which the disk pack sways back and forth in the Z axis direction due to the flexibility of the base casting and cover and the mass of the disk pack. The other primary low frequency mode is the lower spindle tilt mode. The lower spindle tilt mode refers to the lower split of the spindle tilt mode. The spindle tilt mode is at one frequency when the disk pack is not spinning, but splits into two frequencies when the spindle motor starts running.

Those knowledgeable in the disk drive arts appreciate that it is desirable that the pack bounce and lower spindle tilt modes be separated by 20 Hz or more. If they are not separated, then energy near one frequency can excite both modes, causing the heads to move offtrack. Further, it has been found that the peak offtrack produced when the modes are not separated can be much larger than the offtrack produced by either mode when they are not separated.

Efforts have been made to address these problems in the prior art. For example, U.S. Pat. No. 5,587,855 issued to Kim describes a supporting device installed into a disk drive assembly to minimize the damage caused by physical shocks and vibrations. The described device includes a triangular plate mounted on the shaft of the spindle motor. The device also includes a damper attached to the upper and lower portions of the plate. The plate itself is mounted to the shaft of the spindle motor, pivot and base casting of the drive by bolts or adhesive.

U.S. Pat. No. 5,235,482 issued to Schmitz describes a magnetic disk drive which incorporates a mechanically damped base which is comprised of a layer of adhesive materials inserted between the base assembly and a circuit board assembly. To this end, an adhesive gasket is installed about the periphery of the disk file cover, separating the cover from the base.

U.S. Pat. No. 4,764,829 issued to Makino describes a leaf spring element installed about the base of the pivot point for the actuator to correct positioning errors of a head in a magnetic storage system.

Another approach to the problem of physical shocks and vibrations found in disk drive systems has been to thicken the base casting or cover, as can be found in the IBM 1.6 inch disk drives currently available. The base casting or cover is typically made thick enough so that the pack bounce frequency is 20 Hz or more higher than the lower spindle tilt frequency. This solution, however, takes up valuable space in the disk stack area. In order to accommodate more disks, this space needs to be reallocated from the base casting and cover thickness to the interior of the disk drive. However, as the base casting or cover is thinned, the pack bounce mode is lowered in frequency and approaches the lower spindle tilt frequency, causing the previously described head offtrack problems.

As can be readily seen, the aforementioned solutions include adding components and complexity into the disk drive assembly in order to address and minimize the problems caused by vibrations and shock. Each solution includes separately manufactured components that add cost and complexity to the assembly, or take up valuable space in the disk stack area which does not lend itself easily as a solution to high density recording. In addition, the industry trend towards higher capacities in disk drives means that future products will contain more disks. Accordingly, this means that Z axis space will have to be optimally utilized to provide room for these disks.

For the foregoing reasons, it becomes necessary to engineer a new apparatus for addressing the problems associated with physical shocks and vibrations to a disk drive assembly, that is independent of the size of the disk drive assembly.

SUMMARY OF THE INVENTION

To overcome the shortcomings of the prior art, it is the object of the invention to provide an apparatus for minimizing the damage to a disk drive assembly caused by physical shocks and vibrations. It is the further object of the invention to provide an apparatus that separates the pack bounce frequency and lower spindle tilt frequency to minimize head offtrack problems associated with shocks and vibrations to a disk drive assembly. It is the further object of the invention to provide an apparatus that addresses the aforementioned problems without adding additional cost to the disk drive manufacturing processes, and also to provide an apparatus that does not consume space in the disk pack area of the disk drive assembly. In addition, it is the object of the invention to provide an apparatus that provides damping for the pack bounce mode.

In accordance with these objects, the present invention provides a disk drive assembly that minimizes the damage to the disk drive caused by physical shocks and vibrations by maintaining a separation between the pack bounce frequency and the low spindle tilt frequency of the magnetic storage system. In a preferred embodiment, the present invention provides a disk drive with a base casting having a slit or slits completely therethrough, at a location or locations near and/or surrounding the disk pack spindle attachment point. Alternatively, the slits may be made through the cover of the disk drive assembly in drives where the disk pack spindle also attaches to the cover of the disk drive.

The slits in accordance with the present invention would be sealed by tape. The tape would prevent the entrance of contaminants to the disk drive assembly and, in addition, would add damping to the pack bounce mode.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a part hereof, and to the accompanying descriptive matter, in which there is illustrated and described specific examples of an apparatus and method in accordance with the invention.

DESCRIPTION OF THE ILLUSTRATED EMBODIMENTS

The present invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
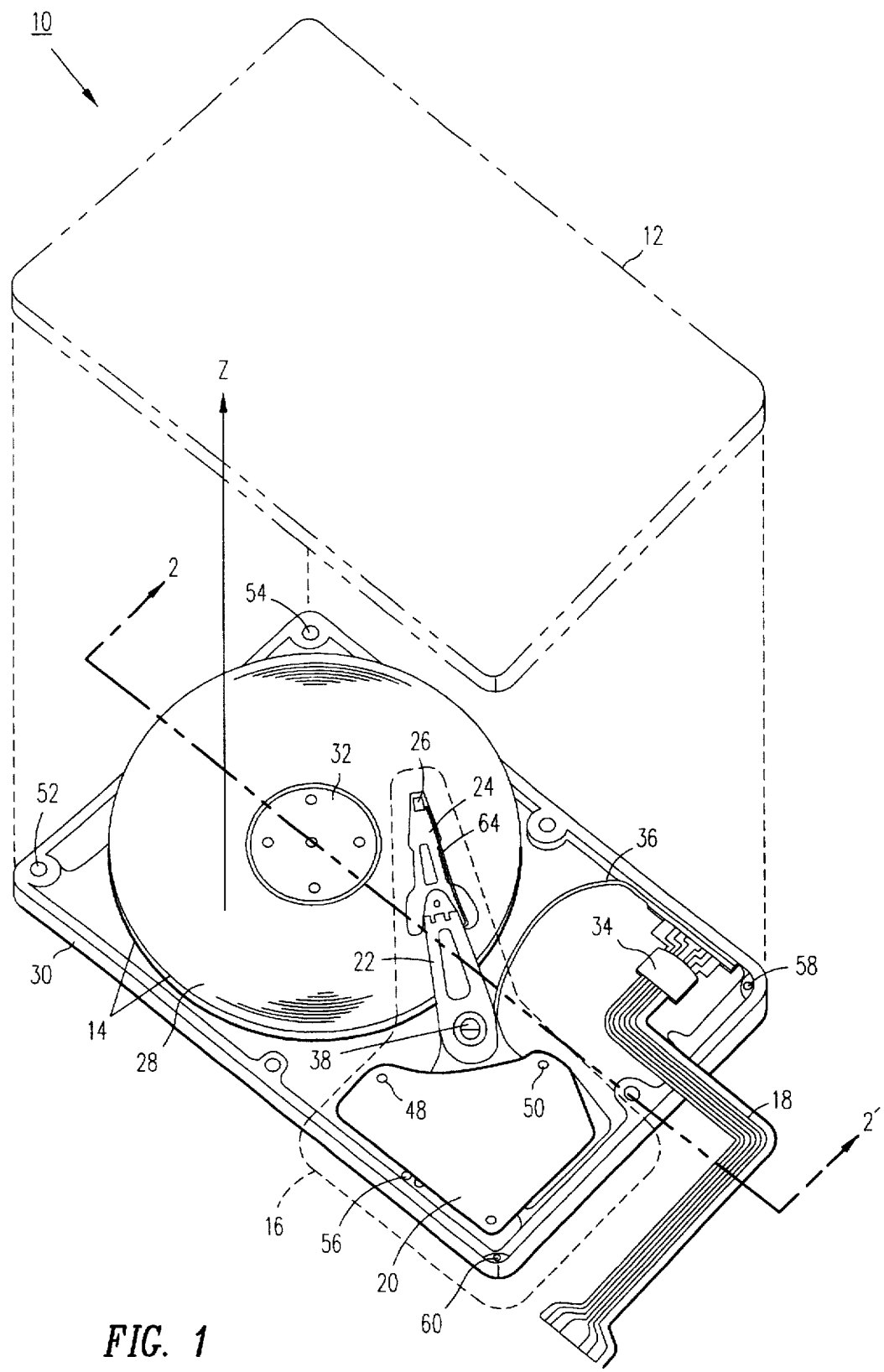
FIG. 1 illustrates a perspective view of a disk drive in accordance with the present invention showing the inside of the disk drive.

FIG. 1 shows a disk drive system, designated by the general reference number 10. The cover 12 of the disk drive is shown exploded and in phantom. In operation, the cover 12 would be disposed atop of base casting 30 by screws or other suitable fastening means at points 52, 54, 58 and 60. As seen with reference to FIG. 1, both cover 12 and base casting 30 are partial enclosures of the disk stack area.

The disk drive comprises one or more magnetic disks 14. The disks 14 may be conventional particulate or thin film recording disks, which are capable of storing digital data in concentric tracks. In a preferred embodiment, both sides of the disks 14 are available for storage, and it will be recognized by one of ordinary skill in the art that the disk drive 10 may include any number of such disks 14.

The disks 14 are mounted to a spindle shaft 32. The spindle shaft 32 is attached to a spindle motor which rotates the spindle 32 and the disks 14 to provide read/write access to the various portions of the concentric tracks on the disks 14.

An actuator assembly 16 is indicated by the dashed lines in FIG. 1. The actuator assembly 16 includes a positioner arm 22, and a suspension assembly 24. The suspension assembly 24 includes a read/write head 26 at its distal end. Although only one read/write head 26 of the suspension assembly is shown, it will be recognized that the disk drive 10 has one read/write head for each side of each disk 14 included in the drive. The positioner arm 22 further comprises a pivot 38 around which the positioner arm 22 pivots.

The disk drive 10 further includes read/write chip 34. As is well known in the art, the read/write chip 34 cooperates with the read/write heads 26 to read data from and write data to the disks 14. A flexible printed circuit member 36 carries digital signals between the chip 34 and the actuator assembly 16. One or more electrical conductors 64 are routed along the pivot arm 22 and suspension 24 to carry electrical signals to and from the read/write head 26. A separate flexible printed circuit member 18 interfaces with the chip 34 and associated drive electronics (not shown). A vcm top plate 20 is also shown in FIG. 1 and is part of the actuator assembly 16. The actuator assembly 16 also includes vcm bottom plate 56, a magnet and a coil (both of which are not shown). In operation, the vcm top plate 20 is disposed above vcm bottom plate 56 and the magnet. As current passes through the coil, it interacts with the magnetic field of the magnet so as to rotate the positioner arm 22 and suspension assembly 24 to position the read/write head as desired over the correct data track on the disk 14. After the signal is received from the drive electronics, and the actuator assembly 16 is in motion, it can readily be seen that external shocks or vibrations in the Z axis direction can shift the pivot arm 22 off track. Thus, the system must be designed to minimize the effects of shocks and vibrations to the disk drive assembly 10.

Figure 2:
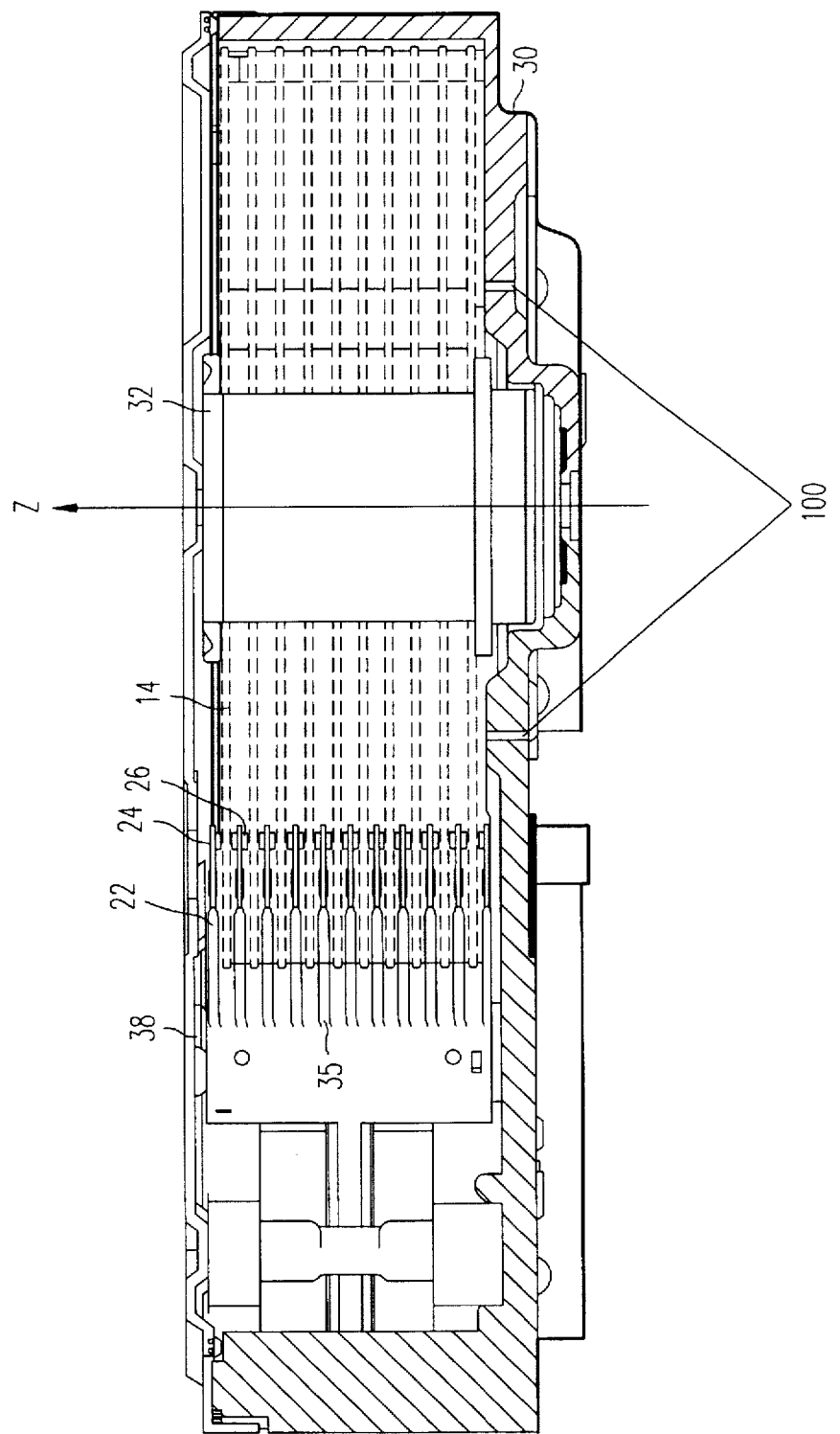
FIG. 2 illustrates a side sectional view of the disk drive taken along lines 2–2' of FIG. 1.

Referring now to FIG. 2, a side sectional view of disk drive 10 is shown, taken along lines 2–2' of FIG. 1. Spindle 32 supports a plurality of disks 14 within the disk drive 10, providing rotational movement of disks 14 around the Z axis. A plurality of read/write heads 26 and suspension assemblies 24 are supported by an actuator comb 35 which provides pivotal motion around pivot point 38. Proximate the spindle shaft 32 through base casting 30 are located a pair of slits 100. Slits 100 are made entirely through base casting 30 so as to weaken the structural support of the disk pack. Slits 100 will be shown and described in greater detail in FIGS. 3 through 5.

Figure 3:
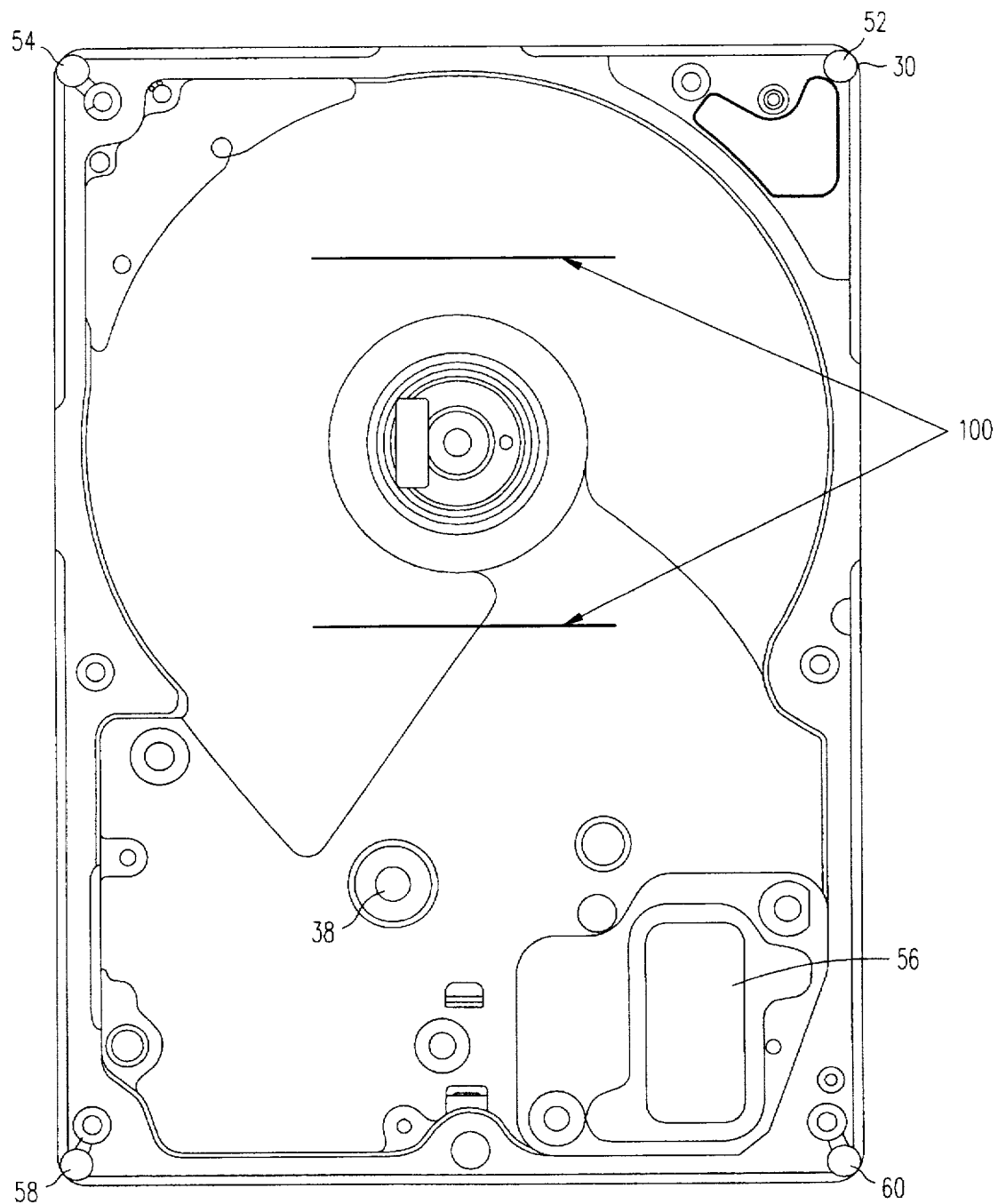
FIG. 3 is a bottom plan view of a magnetic storage system as shown in FIG. 2, showing one embodiment of the base casting in accordance with the present invention.
Figure 4:
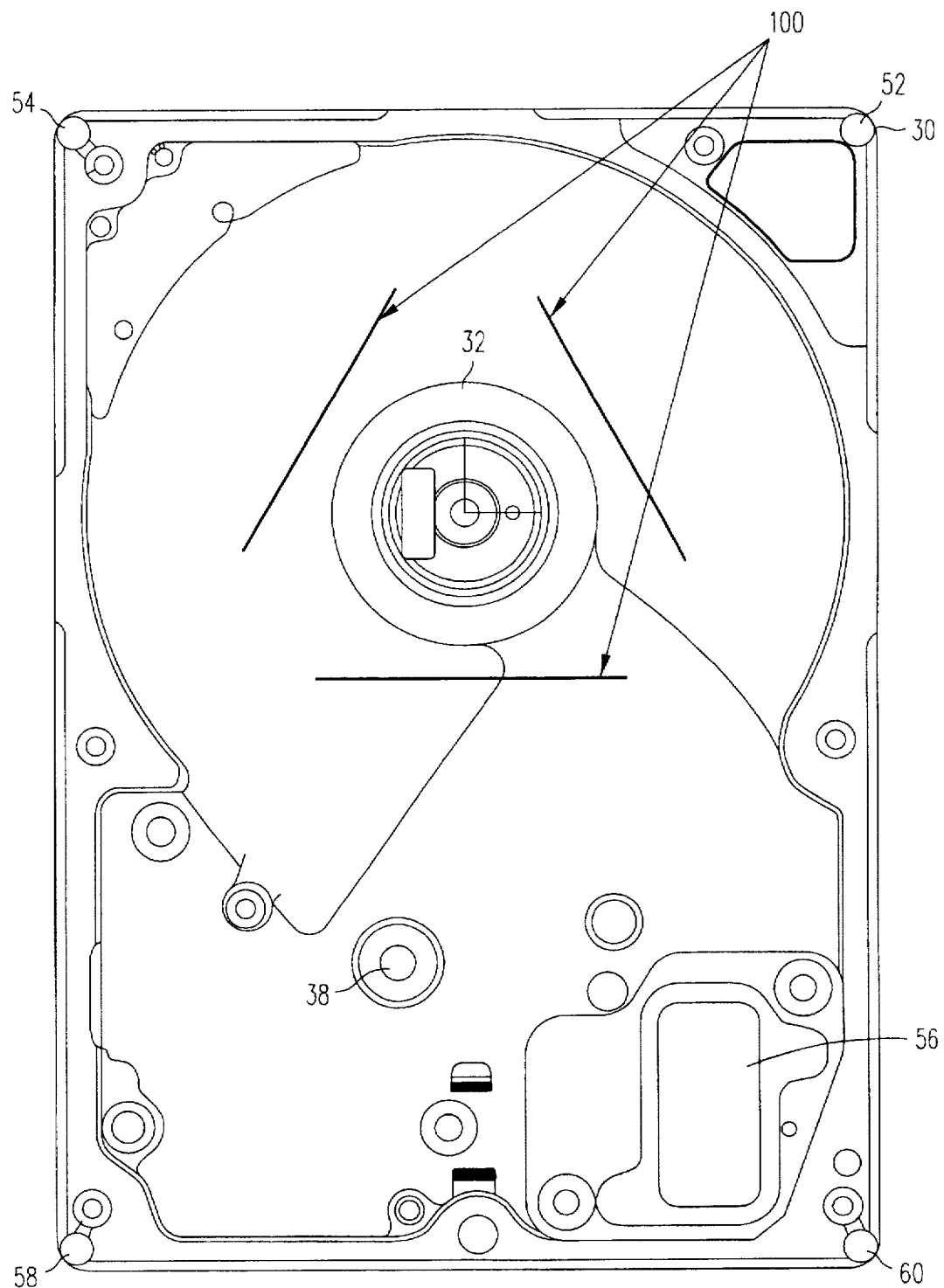
FIG. 4 is a bottom plan view of a magnetic storage system showing a second alternative embodiment of the base casting in accordance with the present invention.
Figure 5:
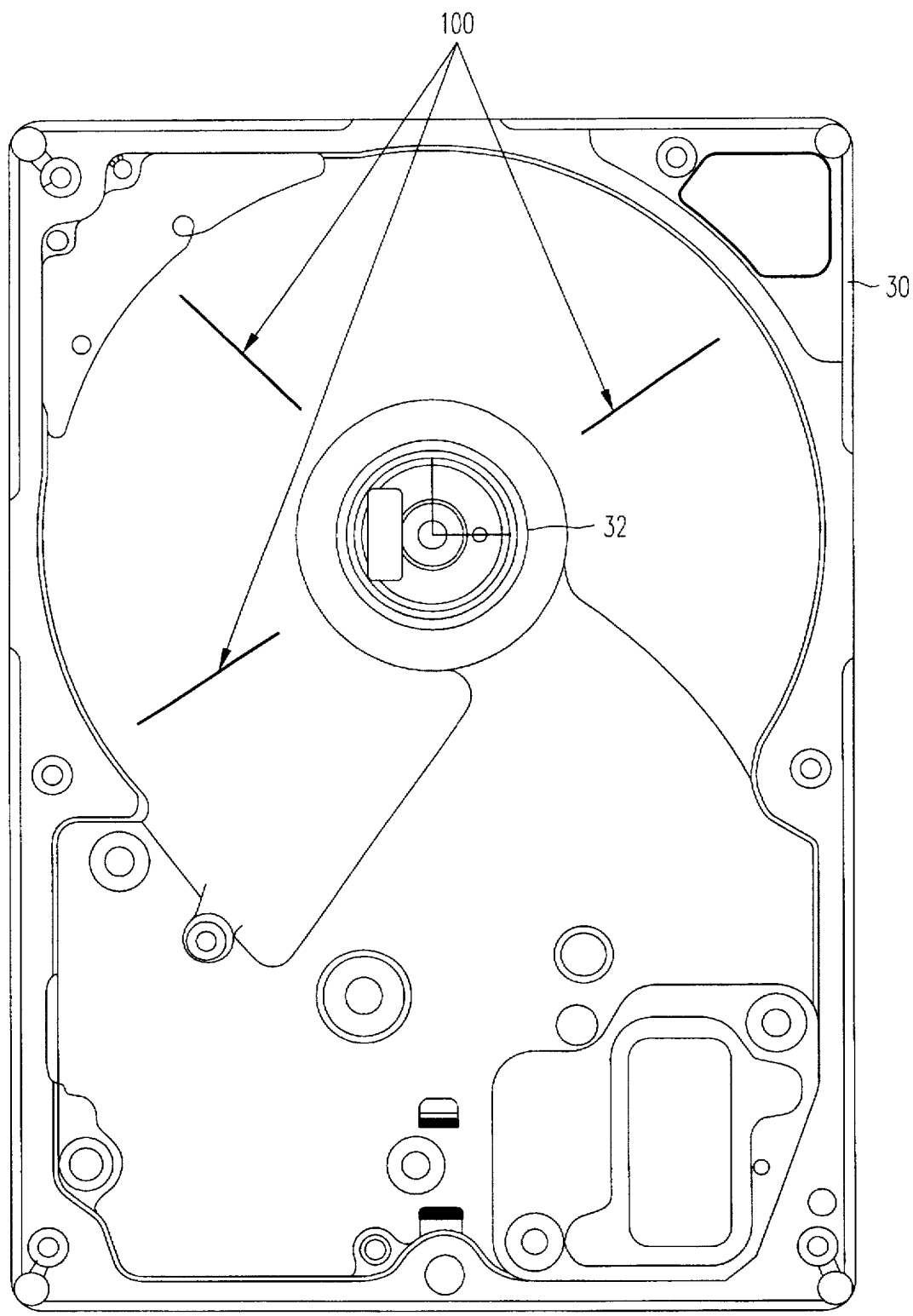
FIG. 5 is a bottom plan view of a magnetic storage system showing a third alternative embodiment of the base casting in accordance with the present invention.

FIGS. 3 through 5 illustrate several embodiments of the present invention, with reference to the base casting 30 of the magnetic storage system 10. It is appreciated by those skilled in the art the various configurations shown in FIGS. 3 through 5 and others can easily be implemented in the cover 12 of the magnetic storage system 10 and those alternatives are considered to be within the spirit and scope of the present invention.

FIG. 3, which is a bottom view of the disk drive system, shows a first embodiment of the present invention, wherein a pair of slits 100 are made about the spindle shaft 32 in the base casting 30 of the magnetic storage system 10. Slits 100 extend completely through the base casting 30 from the outer surface of the base casting 30 to the inner surface. Slits 100 can be die cast as part of the base mold when the base casting 30 is made, or alternatively can be machined into the base casting 30 at subsequent stages in the manufacturing processes. The width and length of the slits 100 would vary from one disk file system to another, based on the various performance requirements of the magnetic storage system. The function of slits 100 is to weaken the structural support for the disk pack, and, accordingly, the length of the cuts would be that which is necessary to reduce the pack bounce frequency so that it is below the lower spindle tilt frequency. It has been determined that the pack bounce and lower spindle tilt modes should be separated by 20 Hz or more in order to avoid head offtrack problems.

FIG. 4 shows another embodiment of the present invention, wherein a plurality of slits 100 are made about the spindle shaft 32.

FIG. 5 shows an alternative configuration of the slits 100 shown and described in connection with FIG. 3. Here, the slits extend outward radially from the disk pack spindle shaft 32 at various points about the spindle shaft 32.

In addition to weakening the base casting 30 in the area about the spindle shaft 32, the present invention further provides damping for the pack bounce mode by including an adhesive tape over the slits. The adhesive tape also prevents contamination of the disk drive assembly. One preferred adhesive tape is comprised of a 0.003 inch thick copper substrate coated with a 0.005 inch thick layer of 3M 468MS acrylate adhesive. The tape acts as a constrained layer damper in that some of the energy of motion of the base casting surrounding the slit is converted to heat by shear deformation of the adhesive.

While the present invention has been particularly shown and described with reference to the illustrated embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims. Although this description of the invention describes the apparatus and method in connection with the base casting 30 of the disk drive assembly, it is obvious that the same method and apparatus can be used in the cover 12 of the disk drive assembly 12.

What is claimed is:

1. A base casting for a magnetic storage system comprising:
   a partial enclosure for a disk pack mounted on a spindle shaft, said partial enclosure having an inner surface proximate to said spindle shaft and an outer surface;
   an attachment area located on the inner surface of said partial enclosure to which said spindle shaft is attached; and
   at least one slit on said partial enclosure extending from said outer surface to said inner surface, said slit being located proximate to said attachment area.

2. The base casting according to claim 1, further comprising a pair of slits located on said partial enclosure, said slits being parallel to each other and being located at diametrically opposed points on either side of said attachment area.

3. The base casting according to claim 1, further comprising a plurality of slits extending radially from said attachment area.

4. The base casting according to claim 1, further comprising a plurality of slits partially enclosing said attachment area.

5. The base casting according to claim 1, further comprising a sidewall extending from the perimeter of said inner surface of said partial enclosure in a direction substantially perpendicular to said inner surface.

6. The base casting according to claim 1, further comprising an adhesive tape covering said slits.

7. A cover for a magnetic storage system comprising:
   a partial enclosure for a disk pack mounted on a spindle shaft, said partial enclosure having an inner surface proximate to said spindle shaft and an outer surface;
   an attachment area located on the inner surface of said partial enclosure to which said spindle shaft is attached; and
   at least one slit on said partial enclosure extending from said outer surface to said inner surface, said slit being located proximate to said attachment area.

8. The cover according to claim 7, further comprising a pair of slits located on said partial enclosure, said slits being parallel to each other and being located at diametrically opposed points on either side of said attachment area.

9. The cover according to claim 7, further comprising a plurality of slits extending radially from said attachment area.

10. The cover according to claim 7, further comprising a plurality of slits partially enclosing said attachment area.

11. The cover according to claim 7, further comprising a sidewall extending from the perimeter of said inner surface of said partial enclosure in a direction substantially perpendicular to said inner surface.

12. The cover according to claim 7, further comprising an adhesive tape covering said slits.

13. A magnetic storage system comprising:
   a disk with a data surface of concentric data tracks;
   a spindle shaft supporting said disk, said spindle shaft for rotating said disk about an axis generally perpendicular to the disk;
   a slider maintained in operative relationship with the data surface when the disk is rotating;
   a transducer attached to the slider for reading data from and writing data to the data surface;
   an actuator for moving the slider generally radially relative to the disk to allow the transducer to access the data tracks;

an electronics module for processing data read from and written to the data surface;

a suspension for connecting said slider to said actuator;

a partial enclosure for said disk and spindle shaft, said partial enclosure comprising an inner surface, an outer surface and a spindle shaft mounting area; and a slit located on said partial enclosure extending from said inner surface to said outer surface, said slit located proximate to said spindle shaft mounting area.

14. The magnetic storage system according to claim 13, further comprising a pair of slits located on said partial enclosure, said slits being parallel to each other and being located at diametrically opposed points on either side of said spindle shaft mounting area.

15. The magnetic storage system according to claim 13, further comprising a plurality of slits extending radially from said spindle shaft mounting area.

16. The magnetic storage system according to claim 15, further comprising a plurality of slits partially enclosing said spindle shaft mounting area.

17. The magnetic storage system according to claim 16, further comprising a sidewall extending from the perimeter of said inner surface of said partial enclosure in a direction substantially perpendicular to said inner surface.

18. The magnetic storage system according to claim 17, further comprising an adhesive tape covering said slits.

* * * * *